United States Patent
Apt et al.

(10) Patent No.: US 9,008,301 B2
(45) Date of Patent: Apr. 14, 2015

(54) SYSTEM AND METHOD FOR MODIFYING OR DISABLING THE RINGTONE FOR AN INCOMING CALL BASED ON THE EXISTENCE OF NONEXISTENCE OF PREVIOUS CALLS FROM THE SAME CALLER

(71) Applicants: Boaz Apt, Yehud (IL); Shai Cohen, Binyamina (IL)

(72) Inventors: Boaz Apt, Yehud (IL); Shai Cohen, Binyamina (IL)

(73) Assignees: Boaz APT, Yehud (IL); Shai Cohen, Binyamina (IL)

( * ) Notice: Subject to any disclaimer, the term of this patent is extended or adjusted under 35 U.S.C. 154(b) by 0 days.

(21) Appl. No.: 14/129,787

(22) PCT Filed: Mar. 19, 2013

(86) PCT No.: PCT/IL2013/050261
§ 371 (c)(1),
(2) Date: Dec. 27, 2013

(87) PCT Pub. No.: WO2013/144949
PCT Pub. Date: Oct. 3, 2013

(65) Prior Publication Data
US 2014/0219440 A1    Aug. 7, 2014

Related U.S. Application Data

(60) Provisional application No. 61/615,938, filed on Mar. 27, 2012.

(51) Int. Cl.
*H04M 1/00*   (2006.01)
*H04M 19/04*  (2006.01)
*H04M 1/57*   (2006.01)
*H04M 3/42*   (2006.01)

(52) U.S. Cl.
CPC .......... *H04M 19/04* (2013.01); *H04M 3/42068* (2013.01); *H04M 1/57* (2013.01)

(58) Field of Classification Search
None
See application file for complete search history.

(56) References Cited

U.S. PATENT DOCUMENTS 7,233,658 B2    6/2007  Koser et al.
7,443,967 B1 *  10/2008 Silver ................ 379/106.09

(Continued)

FOREIGN PATENT DOCUMENTS

EP    1874017 A1    1/2008
EP    1885101 A1    2/2008

OTHER PUBLICATIONS

International Search Report dated Jul. 22, 2013 in corresponding International Application No. PCT/IL2013/050261.

*Primary Examiner* — Fan Tsang
*Assistant Examiner* — Jeffrey Lytle
(74) *Attorney, Agent, or Firm* — The Law Office of Michael E. Kondoudis

(57) ABSTRACT

The present invention provides a system for managing and disabling phone ring tone profiles, the system comprising: a. a storage system comprising (a) a plurality of ringtones adapted to be activated when an incoming call is made; and, (b) at least one list of identified callers; b. processor to execute at least one data processing system, said at least one data processing system comprising: i. an acquiring module operable to read an identifier of said incoming call or an incoming message; ii. a detecting module operable to detect if the identifier exists in said at least one list in the system, to determine the caller from said list, and to detect how many incoming calls have been made within a predetermined period of time; and iii. a disabling module adapted to either activate or disable said ringtones.

20 Claims, 5 Drawing Sheets

(56) References Cited

U.S. PATENT DOCUMENTS

| | | |
|---|---|---|
| 7,644,166 B2 | 1/2010 | Appelman et al. |
| 7,693,944 B2 | 4/2010 | Appelman et al. |
| 8,116,826 B2 | 2/2012 | Kraft et al. |
| 2009/0002127 A1* | 1/2009 | Kraft et al. .................. 340/7.52 |
| 2010/0067677 A1* | 3/2010 | Fong ........................ 379/142.05 |

* cited by examiner

US 9,008,301 B2

SYSTEM AND METHOD FOR MODIFYING OR DISABLING THE RINGTONE FOR AN INCOMING CALL BASED ON THE EXISTENCE OF NONEXISTENCE OF PREVIOUS CALLS FROM THE SAME CALLER

FIELD OF THE INVENTION

The present invention generally pertains to a system and method for modifying the ringtone for an incoming call based on the existence of previous calls from the same caller.

BACKGROUND OF THE INVENTION

There are many methods of tailoring the signal that a message is arriving at a communication device, including allowing the caller to set a signal (U.S. Pat. No. 7,644,166); allowing the recipient to differentiate the signal depending on the grouping of signal arriving, such as having different signals for text messages, voice messages and communications from friends (U.S. Pat. No. 7,233,658); combining caller identification and receiver identification (U.S. Pat. No. 7,693,944), varying the signal according to the length of time the signal has continued (European patent application EP1885101), and allowing the caller to include an identifier signaling to the recipient the urgency of the communication (European patent application EP1874017).

However, all of prior art modify the signal of an incoming communication based only on information pertaining to that communication.

It is therefore a long felt need to provide a means whereby the signal of a pending incoming communication may be modified based on more than just the information pertaining to a single communication.

SUMMARY OF THE INVENTION

It is an object of the present invention to disclose a system for modifying the ringtone for an incoming call based on the existence of previous calls from the same caller.

It is one object of the present invention to provide a system for managing and disabling phone ring tone profiles, the system comprising:
a. a storage system comprising (a) a plurality of ringtones adapted to be activated when an incoming call is made; and, (b) at least one list of identified callers;
b. at least one processor to execute at least one data processing system, said at least one data processing system comprising:
 i. an acquiring module operable to read an identifier of said incoming call or an incoming message;
 ii. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and
 iii. a disabling module adapted to either activate or disable said ringtones according to at least one selected from a group consisting of (a) the number of calls by the same caller within said predetermined period of time; (b) the number of calls having the same identifier within said predetermined period of time; and any combination thereof;

wherein said disabling module of said system disables said ringtones if said number of calls having said same identifier or being made by said same caller within said predetermined period of time is no more than a predetermined amount; further wherein said disabling module of said system activates said ringtones if said number of calls having said same identifier or being made by said same caller within said predetermined period of time is no less than a predetermined amount.

It is another object of the present invention to provide the system as defined above, wherein said identifier is the caller number; said identifier is selected from a group consisting of: a cell phone number, a landline number, an e-mail address, a Skype number, an sms number, and a what's up number, Viber, FaceTime, incoming communication, apple vidio call, google talk, Facebook messenger, msn messenger, yahoo messenger, AOL messenger, icq, MobileVOIP, scydo, VoipBuster, Tango Video Calls, GersenKaKaoTalk, TalkingTomCat, Messenger With You, any communication software that uses internet, and any combination thereof.

It is another object of the present invention to provide the system as defined above, further comprising a setting module operable to provide a user interface for the system.

It is another object of the present invention to provide the system as defined above, wherein said ringtone is selected from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof.

It is another object of the present invention to provide the system as defined above, wherein said disabling module is adapted to select said ringtone based on at least one selected from a group consisting of: the frequency of said incoming calls, the number of said incoming calls, the number of said incoming calls within a given time, the time since the last incoming call, and any combination thereof.

It is another object of the present invention to provide the system as defined above, wherein said predetermined period of time is more than about 1 minute and less than about 12 hours.

It is another object of the present invention to provide the system as defined above, wherein said predetermined period of time is about 5 minutes.

It is another object of the present invention to provide the system as defined above, wherein the first at least one call, in a predetermined period of time, from a given caller or identifier is mute, the second at least one call is signaled by a vibratory signal, and the third and subsequent at least one calls are signaled by a ringtone, with the volume of the ringtone increasing with each call.

It is another object of the present invention to provide the system as defined above, wherein the first at least one call, in a predetermined period of time, from a given caller or identifier is mute, the second at least one call is signaled by a vibratory signal, and the third and subsequent at least one calls are signaled by ringtones, with the ringtones differing for each call in the series.

It is another object of the present invention to provide the system as defined above, wherein the first at least one call, in a predetermined period of time, from a given caller or identifier is mute, the second at least one call is signaled by a vibratory signal, and the third and subsequent at least one calls are signaled by the same ringtone.

It is another object of the present invention to provide the system as defined above, wherein the first at least one call, in a predetermined period of time, from a given caller or identifier is mute, the second and subsequent at least one calls are signaled by a ringtone, with the volume of the ringtone increasing with each call.

It is another object of the present invention to provide the system as defined above, wherein the first at least one call, in a predetermined period of time, from a given caller or identifier is mute, the second and subsequent at least one calls are signaled by ringtones, with the ringtones differing for each call in the series.

It is another object of the present invention to provide the system as defined above, wherein the first at least one call, in a predetermined period of time, from a given caller or identifier is mute, the second and subsequent at least one calls are signaled by the same ringtone.

It is another object of the present invention to provide the system as defined above, wherein presence of the system in a device is shown by an icon.

It is another object of the present invention to provide the system as defined above, wherein said system is activated and deactivated via said icon.

It is another object of the present invention to provide the system as defined above, wherein parameters of the system are set via said icon.

It is another object of the present invention to provide the system as defined above, wherein the default number of calls for each step in the graduated series is 1.

It is another object of the present invention to provide the system as defined above, wherein there are at least two screens of alterable parameters, a simple screen and an advanced screen It is another object of the present invention to provide the system as defined above, wherein the parameters alterable via the simple screen are selected from a group consisting of: the predetermined time, the number of calls for each step in the graded series, and any combination thereof.

It is another object of the present invention to provide the system as defined above, wherein the parameters alterable via the advanced screen are selected from a group consisting of: progression in the series depends on the maximum time for which a call is counted as part of a series; progression in the series depends on the frequency of the calls; whether calls are checked by caller whether calls are checked by identifier; whether calls from callers not on any list of callers are always mute (default); whether calls from identifiers not on any list of identifiers are always mute; the number of steps in the graduated series; a time at which the applications starts automatically; and a time at which it the application shuts down automatically.

It is another object of the present invention to provide the system as defined above, additionally comprising a private log wherein at least one of callers and call identifiers are stored for a predetermined time.

It is another object of the present invention to provide the system as defined above, wherein said ringtone is determined from the number of calls from said caller in said private log.

It is another object of the present invention to provide the system as defined above, wherein said ringtone is determined from the number of calls from said identifier in said private log.

It is another object of the present invention to provide a system for managing phone ring tone profiles, the system comprising:
a. a storage system comprising (a) a plurality of ringtones; at least one of which is a mute ring tone profile of the system and at least one second ring tone profile of the system; said at least one second ring tone profile of the system is substantially different from said mute ring tone profile; and, (b) at least one list of identified callers;
b. at least one processor to execute at least one data processing system, said at least one data processing system comprising:
   i. an acquiring module operable to read an identifier of an incoming call or an incoming message;
   ii. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and
   iii. a switching module operable to select the current ring tone from said plurality of stored ringtones according to at least one selected from a group consisting of (a) the number of calls by the same caller within said predetermined period of time; (b) the number of calls having the same identifier within said predetermined period of time; and any combination thereof;
wherein said ring tone profile of said system is set to be said mute ring tone profile if said number of calls having said same identifier within said predetermined period of time is no more than a predetermined amount; further wherein said ring tone profile of said system is set to be said second ring tone profile if said number of calls being made by said same caller within said predetermined period of time is no less than a predetermined amount; further wherein said ring tone profile of said system is set to be said at least one second ring tone profile if said number of calls having said same identifier within said predetermined period of time is more than a predetermined amount; further wherein said ring tone profile of said system is set to be said at least one second ring tone profile if said number of calls being made by said same caller within said predetermined period of time is more than a predetermined amount.

It is another object of the present invention to provide the system as defined above, wherein said identifier is the caller number; said identifier is selected from a group consisting of: a cell phone number, a landline number, an e-mail address, and a Skype number, an sms number, a what's up number, Viber, FaceTime, incoming communication, apple vidio call, google talk, Facebook messenger, msn messenger, yahoo messenger, AOL messenger, icq, MobileVOIP, scydo, VoipBuster, Tango Video Calls, GersenKaKaoTalk, TalkingTomCat, Messenger With You, any communication software that uses internet, and any combination thereof.

It is another object of the present invention to provide the system as defined above, further comprising a setting module operable to provide a user interface for the system.

It is another object of the present invention to provide the system as defined above, wherein said ringtone is selected from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof.

It is another object of the present invention to provide the system as defined above, wherein said switching module is adapted to select said ringtone based on at least one selected from a group consisting of: the frequency of said incoming calls, the number of said incoming calls, the number of said incoming calls within a given time, the time since the last incoming call, and any combination thereof.

It is another object of the present invention to provide the system as defined above, wherein said predetermined period of time is more than about 1 minute and less than about 12 hours.

It is another object of the present invention to provide the system as defined above, wherein said predetermined period of time is about 5 minutes.

It is another object of the present invention to provide the system as defined above, wherein the first at least one call, in a predetermined period of time, from a given caller or identifier is mute, the second at least one call is signaled by a vibratory signal, and the third and subsequent at least one calls are signaled by a ringtone, with the volume of the ringtone increasing with each call.

It is another object of the present invention to provide the system as defined above, wherein the first at least one call, in a predetermined period of time, from a given caller or identifier is mute, the second at least one call is signaled by a vibratory signal, and the third and subsequent at least one calls are signaled by ringtones, with the ringtones differing for each call in the series.

It is another object of the present invention to provide the system as defined above, wherein the first at least one call, in a predetermined period of time, from a given caller or identifier is mute, the second at least one call is signaled by a vibratory signal, and the third and subsequent at least one calls are signaled by the same ringtone.

It is another object of the present invention to provide the system as defined above, wherein the first at least one call, in a predetermined period of time, from a given caller or identifier is mute, the second and subsequent at least one calls are signaled by a ringtone, with the volume of the ringtone increasing with each call.

It is another object of the present invention to provide the system as defined above, wherein the first at least one call, in a predetermined period of time, from a given caller or identifier is mute, the second and subsequent at least one calls are signaled by ringtones, with the ringtones differing for each call in the series.

It is another object of the present invention to provide the system as defined above, wherein the first at least one call, in a predetermined period of time, from a given caller or identifier is mute, the second and subsequent at least one calls are signaled by the same ringtone.

It is another object of the present invention to provide the system as defined above, wherein presence of the system in a device is shown by an icon.

It is another object of the present invention to provide the system as defined above, wherein said system is activated and deactivated via said icon.

It is another object of the present invention to provide the system as defined above, wherein parameters of the system are set via said icon.

It is another object of the present invention to provide the system as defined above, the default number of calls for each step in the graduated series is 1.

It is another object of the present invention to provide the system as defined above, wherein there are at least two screens of alterable parameters, a simple screen and an advanced screen It is another object of the present invention to provide the system as defined above, wherein the parameters alterable via the simple screen are selected from a group consisting of: the predetermined time, the number of calls for each step in the graded series, and any combination thereof.

It is another object of the present invention to provide the system as defined above, wherein the parameters alterable via the advanced screen are selected from a group consisting of: progression in the series depends on the maximum time for which a call is counted as part of a series; progression in the series depends on the frequency of the calls; whether calls are checked by caller whether calls are checked by identifier; whether calls from callers not on any list of callers are always mute (default); whether calls from identifiers not on any list of identifiers are always mute; the number of steps in the graduated series; a time at which the applications starts automatically; and a time at which it the application shuts down automatically.

It is another object of the present invention to provide the system as defined above, additionally comprising a private log wherein at least one of callers and call identifiers are stored for a predetermined time.

It is another object of the present invention to provide the system as defined above, wherein said ringtone is determined from the number of calls from said caller in said private log.

It is another object of the present invention to provide the system as defined above, wherein said ringtone is determined from the number of calls from said identifier in said private log.

It is another object of the present invention to provide a method for managing and disabling phone ring tone profiles, comprising steps of:
    a. providing a system comprising:
        i. a storage system comprising (a) a plurality of ringtones adapted to be activated when an incoming call is made; and, (b) at least one list of identified callers;
        ii. at least one processor to execute at least one data processing system, said at least one data processing system comprising:
            1. an acquiring module operable to read an identifier of an incoming call or an incoming message;
            2. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and,
            3. a disabling module adapted to either activate or disable said ringtones according to at least one selected from a group consisting of (a) the number of calls by the same caller within said predetermined period of time; (b) the number of calls having the same identifier within said predetermined period of time; and any combination thereof;
    b. receiving an incoming call;
    c. identifying said identifier for said incoming call;
    d. counting at least one selected from a group consisting of (a) calls from the same identifier; (b) calls made by the same caller;
    e. disabling said ringtones if said number of calls having said same identifier or being made by said same caller within said predetermined period of time is less than a predetermined amount; or enabling said ringtones if said number of calls having said same identifier or being made by said same caller within said predetermined period of time is no less than a predetermined amount.

It is another object of the present invention to provide the method as defined above, comprising an additional step of selecting said identifier to be the caller number; said identifier is selected from a group consisting of: a cell phone number, a landline number, an e-mail address, and a Skype number, an sms number, a what's up number, Viber, FaceTime, incoming communication, apple vidio call, google talk, Facebook messenger, msn messenger, yahoo messenger, AOL messenger, icq, MobileVOIP, scydo, VoipBuster, Tango Video Calls, GersenKaKaoTalk, TalkingTomCat, Messenger With You, any communication software that uses internet, and any combination thereof. It is another object of the present invention to provide the method as defined above, further comprising a setting module operable to provide a user interface for the system.

It is another object of the present invention to provide the method as defined above, comprising an additional step of selecting said ringtone from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof.

It is another object of the present invention to provide the method as defined above, comprising an additional step of basing selection of said ringtone by said disabling module on at least one selected from a group consisting of: the frequency of said incoming calls, the number of said incoming calls, the number of said incoming calls within a given time, the time since the last incoming call, and any combination thereof.

It is another object of the present invention to provide the method as defined above, comprising an additional step of specifying said predetermined period of time to be more than about 1 minute and less than about 12 hours.

It is another object of the present invention to provide the method as defined above, comprising an additional step of specifying said predetermined period of time to be about 5 minutes.

It is another object of the present invention to provide the method as defined above, comprising an additional step of setting the first at least one call, in a predetermined period of time, from a given caller or identifier to be mute, the second at least one call to be signaled by a vibratory signal, and the third and subsequent at least one calls to be signaled by a ringtone, with the volume of the ringtone increasing with each call.

It is another object of the present invention to provide the method as defined above, comprising an additional step of setting the first at least one call, in a predetermined period of time, from a given caller or identifier to be mute, the second at least one call to be signaled by a vibratory signal, and the third and subsequent at least one calls to be signaled by ringtones, with the ringtones differing for each call in the series.

It is another object of the present invention to provide the method as defined above, comprising an additional step of setting the first at least one call, in a predetermined period of time, from a given caller or identifier to be mute, the second at least one call to be signaled by a vibratory signal, and the third and subsequent at least one calls to be signaled by the same ringtone.

It is another object of the present invention to provide the method as defined above, comprising an additional step of setting the first at least one call, in a predetermined period of time, from a given caller or identifier to be mute, the second and subsequent at least one calls to be signaled by a ringtone, with the volume of the ringtone increasing with each call.

It is another object of the present invention to provide the method as defined above, comprising an additional step of setting the first at least one call, in a predetermined period of time, from a given caller or identifier to be mute, the second and subsequent at least one calls to be signaled by ringtones, with the ringtones differing for each call in the series.

It is another object of the present invention to provide the method as defined above, comprising an additional step of setting the first at least one call, in a predetermined period of time, from a given caller or identifier to the mute ringtone, and setting the signal for the second and subsequent at least one calls to be said second ringtone.

It is another object of the present invention to provide the method as defined above, comprising an additional step of showing the presence of the system in a device by an icon.

It is another object of the present invention to provide the method as defined above, comprising an additional step of activating and deactivating said system via said icon.

It is another object of the present invention to provide the method as defined above, comprising an additional step of setting the parameters of the system via said icon.

It is another object of the present invention to provide the method as defined above, comprising an additional step of setting the default number of calls for each step in the graduated series to 1.

It is another object of the present invention to provide the method as defined above, comprising an additional step of providing at least two screens of alterable parameters, a simple screen and an advanced screen.

It is another object of the present invention to provide the method as defined above, comprising an additional step of selecting the parameters alterable via the simple screen from a group consisting of: the predetermined time, the number of calls for each step in the graded series, and any combination thereof.

It is another object of the present invention to provide the method as defined above, comprising an additional step of selecting the parameters alterable via the advanced screen from a group consisting of: progression in the series depends on the maximum time for which a call is counted as part of a series; progression in the series depends on the frequency of the calls; whether calls are checked by caller whether calls are checked by identifier; whether calls from callers not on any list of callers are always mute (default); whether calls from identifiers not on any list of identifiers are always mute; the number of steps in the graduated series; a time at which the applications starts automatically; and a time at which it the application shuts down automatically.

It is another object of the present invention to provide the method as defined above, additionally comprising a step of providing a private log wherein at least one of callers and call identifiers are stored for a predetermined time.

It is another object of the present invention to provide the method as defined above, additionally comprising a step of determining said ringtone from the number of calls from said caller in said private log.

It is another object of the present invention to provide the method as defined above, additionally comprising a step of determining said ringtone from the number of calls from said identifier in said private log.

It is another object of the present invention to provide a method for enabling a communication device to vary an incoming call notification signal comprising steps of:
 a. providing a system comprising:
  i. a storage system comprising (a) a plurality of ringtones; at least one of which is a mute ring tone profile of the system and at least one second ring tone profile of the system; said at least one second ring tone profile of the system is substantially different from said mute ring tone profile; and, (b) at least one list of identified callers;

ii. at least one processor to execute at least one data processing system, said at least one data processing system comprising:
1. an acquiring module operable to read an identifier of an incoming call or an incoming message;
2. a detecting module operable to detect if the identifier exists in said at least one list in the system, to determine the caller from said list, and to detect how many incoming calls have been made within a predetermined period of time having at least one selected from a group consisting of (a) being made from the same identifier; (b) being made by the same caller; and
3. a switching module operable to select the current ring tone from said plurality of stored ringtones according to at least one selected from a group consisting of (a) the number of calls by the same caller within said predetermined period of time; (b) the number of calls having the same identifier within said predetermined period of time; and any combination thereof
b. receiving an incoming call;
c. identifying said identifier for said incoming call;
d. counting at least one selected from a group consisting of (a) calls from the same identifier; (b) calls made by the same caller;
e. setting the current ringtone based on said number of calls, said current ringtone being said mute ringtone profile if said number of calls having either said same identifier or being made by said same caller, within said predetermined period of time, is less than a predetermined number and said current ringtone being said second ring tone profile if said number of calls having either said same identifier or being made by said same caller, within said predetermined period of time, is no less than a predetermined number.

It is another object of the present invention to provide the method as defined above, comprising an additional step of selecting said identifier to be the caller number; said identifier is selected from a group consisting of: a cell phone number, a landline number, an e-mail address, and a Skype number, an sms number, a what's up number, Viber, FaceTime, incoming communication, apple vidio call, google talk, Facebook messenger, msn messenger, yahoo messenger, AOL messenger, icq, MobileVOIP, scydo, VoipBuster, Tango Video Calls, GersenKaKaoTalk, TalkingTomCat, Messenger With You, any communication software that uses internet, and any combination thereof.

It is another object of the present invention to provide the method as defined above, comprising an additional step of providing a setting module operable to provide a user interface for the system.

It is another object of the present invention to provide the method as defined above, comprising an additional step of selecting said ringtone from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof.

It is another object of the present invention to provide the method as defined above, comprising an additional step of basing selection of said ringtone by said switching module on at least one selected from a group consisting of: the frequency of said incoming calls, the number of said incoming calls, the number of said incoming calls within a given time, the time since the last incoming call, and any combination thereof.

It is another object of the present invention to provide the method as defined above, comprising an additional step of specifying said predetermined period of time to be more than about 1 minute and less than about 12 hours.

It is another object of the present invention to provide the method as defined above, comprising an additional step of specifying said predetermined period of time to be about 5 minutes.

It is another object of the present invention to provide the method as defined above, comprising an additional step of setting the first at least one call, in a predetermined period of time, from a given caller or identifier to be mute, the second at least one call is to be signaled by a vibratory signal, and the third and subsequent at least one calls to be signaled by a ringtone, with the volume of the ringtone increasing with each call.

It is another object of the present invention to provide the method as defined above, comprising an additional step of setting the first at least one call, in a predetermined period of time, from a given caller or identifier to be mute, the second at least one call to be signaled by a vibratory signal, and the third and subsequent at least one calls to be signaled by ringtones, with the ringtones differing for each call in the series.

It is another object of the present invention to provide the method as defined above, comprising an additional step of setting the first at least one call, in a predetermined period of time, from a given caller or identifier to be mute, the second at least one call to be signaled by a vibratory signal, and the third and subsequent at least one calls to be signaled by the same ringtone.

It is another object of the present invention to provide the method as defined above, comprising an additional step of setting the first at least one call, in a predetermined period of time, from a given caller or identifier to be mute, the second and subsequent at least one calls to be signaled by a ringtone, with the volume of the ringtone increasing with each call.

It is another object of the present invention to provide the method as defined above, comprising an additional step of setting the first at least one call, in a predetermined period of time, from a given caller or identifier to be mute, the second and subsequent at least one calls to be signaled by ringtones, with the ringtones differing for each call in the series.

It is another object of the present invention to provide the method as defined above, comprising an additional step of setting the first at least one call, in a predetermined period of time, from a given caller or identifier to be mute, the second and subsequent at least one calls to be signaled by the same ringtone.

It is another object of the present invention to provide the method as defined above, comprising an additional step of displaying an icon to symbolize presence of the system in a device.

It is another object of the present invention to provide the method as defined above, comprising an additional step of activating and deactivating the system via the icon.

It is another object of the present invention to provide the method as defined above, comprising an additional step of setting parameters of the system via the icon.

It is another object of the present invention to provide the method as defined above, comprising an additional step of setting the default number of calls for each step in the graduated series to 1.

It is another object of the present invention to provide the method as defined above, comprising an additional step of providing at least two screens of alterable parameters, a simple screen and an advanced screen.

It is another object of the present invention to provide the method as defined above, comprising an additional step of selecting the parameters alterable via the simple screen from a group consisting of: the predetermined time, the number of calls for each step in the graded series, and any combination thereof.

It is another object of the present invention to provide the method as defined above, comprising an additional step of selecting the parameters alterable via the advanced screen from a group consisting of: progression in the series depends on the maximum time for which a call is counted as part of a series; progression in the series depends on the frequency of the calls; whether calls are checked by caller whether calls are checked by identifier; whether calls from callers not on any list of callers are always mute (default); whether calls from identifiers not on any list of identifiers are always mute; the number of steps in the graduated series; a time at which the applications starts automatically; and a time at which it the application shuts down automatically.

It is another object of the present invention to provide the method as defined above, additionally comprising a step of providing a private log wherein at least one of callers and call identifiers are stored for a predetermined time.

It is another object of the present invention to provide the method as defined above, additionally comprising a step of determining said ringtone from the number of calls from said caller in said private log.

It is another object of the present invention to provide the method as defined above, additionally comprising a step of determining said ringtone from the number of calls from said identifier in said private log.

BRIEF DESCRIPTION OF THE FIGURES

In order to better understand the invention and its implementation in practice, a plurality of embodiments will now be described, by way of non-limiting example only, with reference to the accompanying drawings, wherein FIG. 1a schematically illustrates an icon indicating the presence of the system on a communication device.

DETAILED DESCRIPTION OF THE PREFERRED EMBODIMENTS

Figure 1A:
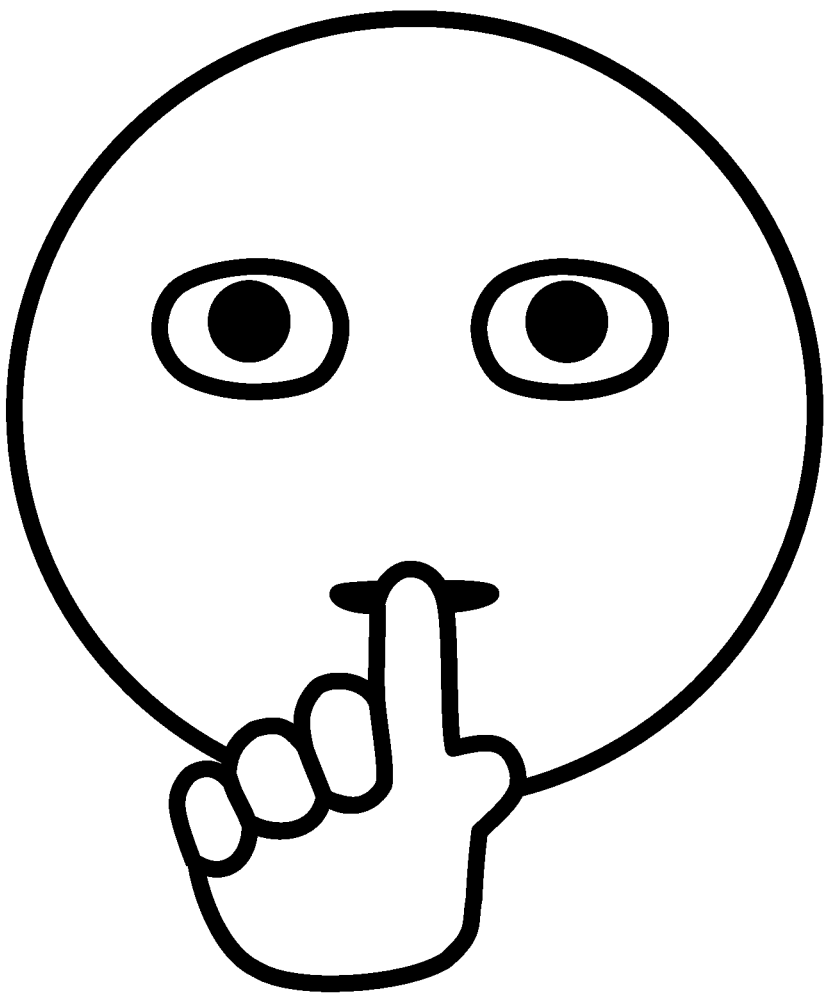
FIGS. 1b, 2 and 3 depict flow charts of embodiments of the system.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for modifying the ringtone for an incoming call based on the existence of previous calls from the same caller.

It is one object of the present invention to provide a system for managing and disabling phone ring tone profiles, the system comprising:
a. a storage system comprising (a) a plurality of ringtones adapted to be activated when an incoming call is made; and, (b) at least one list of identified callers;
b. at least one processor to execute at least one data processing system, said at least one data processing system comprising:
   i. an acquiring module operable to read an identifier of said incoming call or an incoming message;
   ii. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and
   iii. a disabling module adapted to either activate or disable said ringtones according to at least one selected from a group consisting of (a) the number of calls by the same caller within said predetermined period of time; (b) the number of calls having the same identifier within said predetermined period of time; and any combination thereof;

wherein said disabling module of said system disables said ringtones if said number of calls having said same identifier within said predetermined period of time is less than a predetermined amount; further wherein said disabling module of said system disables said ringtones if said number of calls being made by said same caller within said predetermined period of time is less than a predetermined amount.

It is another object of the present invention to provide a method for managing and disabling phone ring tone profiles, comprising steps of:
a. providing a system comprising:
   i. a storage system comprising (a) a plurality of ringtones adapted to be activated when an incoming call is made; and, (b) at least one list of identified callers;
   ii. at least one processor to execute at least one data processing system, said at least one data processing system comprising:
      1. an acquiring module operable to read an identifier of an incoming call or an incoming message;
      2. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and,
      3. a disabling module adapted to either activate or disable said ringtones according to at least one selected from a group consisting of (a) the number of calls by the same caller within said predetermined period of time; (b) the number of calls having the same identifier within said predetermined period of time; and any combination thereof;
b. receiving an incoming call;
c. identifying said identifier for said incoming call;
d. counting at least one selected from a group consisting of (a) calls from the same identifier; (b) calls made by the same caller;
e. disabling said ringtones if said number of calls having said same identifier within said predetermined period of time is less than a predetermined amount; or enabling said ringtones if said number of calls being made by said same caller within said predetermined period of time is no less than a predetermined amount.

It is another object of the present invention to provide a system for managing phone ring tone profiles, the system comprising:
a. a storage system comprising (a) a plurality of ringtones; at least one of which is a mute ring tone profile of the system and at least one second ring tone profile of the system; said at least one second ring tone profile of the system is substantially different from said mute ring tone profile; and, (b) at least one list of identified callers;
b. at least one processor to execute at least one data processing system, said at least one data processing system comprising:
  i. an acquiring module operable to read an identifier of an incoming call or an incoming message;
  ii. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and
  iii. a switching module operable to select the current ring tone from said plurality of stored ringtones according to at least one selected from a group consisting of (a) the number of calls by the same caller within said predetermined period of time; (b) the number of calls having the same identifier within said predetermined period of time; and any combination thereof;
wherein said ring tone profile of said system is set to be said mute ring tone profile if said number of calls having said same identifier within said predetermined period of time is less than a predetermined amount; further wherein said ring tone profile of said system is set to be said second ring tone profile if said number of calls being made by said same caller within said predetermined period of time is greater than a predetermined amount.

It is another object of the present invention to provide a method for enabling a communication device to vary an incoming call notification signal comprising steps of:
a. providing a system comprising:
  i. a storage system comprising (a) a plurality of ringtones; at least one of which is a mute ring tone profile of the system and at least one second ring tone profile of the system; said at least one second ring tone profile of the system is substantially different from said mute ring tone profile; and, (b) at least one list of identified callers;
  ii. at least one processor to execute at least one data processing system, said at least one data processing system comprising:
    1. an acquiring module operable to read an identifier of an incoming call or an incoming message;
    2. a detecting module operable to detect if the identifier exists in said at least one list in the system, to determine the caller from said list, and to detect how many incoming calls have been made within a predetermined period of time having at least one selected from a group consisting of (a) being made from the same identifier; (b) being made by the same caller; and
    3. a switching module operable to select the current ring tone from said plurality of stored ringtones according to at least one selected from a group consisting of (a) the number of calls by the same caller within said predetermined period of time; (b) the number of calls having the same identifier within said predetermined period of time; and any combination thereof
b. receiving an incoming call;
c. identifying said identifier for said incoming call;
d. counting at least one selected from a group consisting of (a) calls from the same identifier; (b) calls made by the same caller;
e. setting the current ringtone based on said number of calls, said current ringtone being said mute ringtone profile if said number of calls having either said same identifier or being made by said same caller, within said predetermined period of time, is less than a predetermined number and said current ringtone being said second ring tone profile if said number of calls having either said same identifier or being made by said same caller, within said predetermined period of time, is greater than a predetermined number.

The term 'ringtone' hereinafter refers to the signal that a communication is arriving. The signal need not be audible. For example, it can consist of, but is not limited to, a vibration, a visible signal, an audible signal, no signal at all, or any combination of these.

The term 'call', when used as a noun, hereinafter refers to a two-way communication between a caller and a recipient, wherein the caller and the recipient are not within earshot of each other. Examples of means used to transmit the conversation are, but are not limited to, a telephone, a two-way radio, and a walkie-talkie.

The term 'call', when used as a verb, hereinafter refers to an attempt by a caller to establish communication with a recipient, wherein the caller and the recipient are not within earshot of each other.

The term 'mute' hereinafter refers to refers to providing no signal that a call has been received that is perceptible beyond the receiving instrument. A call remains mute if the caller's identifier appears on a screen within the receiving instrument so that the user is aware that a call has been received only if the user is looking at the screen. A call is not mute if, for non-limiting examples, the instrument vibrates, or if a flashing light calls attention to that fact that a call is being received.

The term 'identifier' hereinafter refers to a code identifying from where the call is sent. An identifier can be, but is not limited to, a cell phone number, a landline number, an e-mail address, a a Skype number, an sms number, a what's up number, Viber, FaceTime, incoming communication, apple vidio call, google talk, Facebook messenger, msn messenger, yahoo messenger, AOL messenger, icq, MobileVOIP, scydo, VoipBuster, Tango Video Calls, GersenKaKaoTalk, TalkingTomCat, Messenger With You, any communication software that uses internet, and any combination thereof.

The term 'communication device' refers hereinafter to any mobile device or any stationary device.

The term 'caller' hereinafter refers to the entity attempting to contact the recipient. A caller can have more than one identifier. For a non-limiting example, a caller can have a cell phone number, a Skype number, a what's up number, a landline number, Viber, FaceTime, incoming communication, apple vidio call, google talk, Facebook messenger, msn messenger, yahoo messenger, AOL messenger, icq, MobileVOIP, scydo, VoipBuster, Tango Video Calls, GersenKaKaoTalk, TalkingTomCat, Messenger With You, any communication software that uses internet, and any combination thereof.

In the system of the present invention, the signal that a communication is arriving (the ringtone) depends not only on the ringtone chosen by the recipient of the call and the type of message, as is standard in telephony today, but also is enabled to depend on the relationship of the current call to previous calls by the same caller or from the same identifier.

The system of the present invention consists of a differentiated series of responses to a series of calls from a given caller. In a preferred embodiment, the system is embodied by a data processing system enabled to be modify the ringtone of a telephone, preferably a portable telephone, of the variety referred to as a cell phone or a mobile phone.

In a preferred embodiment, the series consists of two responses. The first at least one call from a caller is mute so that the attention of the recipient will not be drawn to the incoming call. The recipient is notified of the second at least one call from the same caller by a ringtone, preferably the current ringtone set in the telephone.

The term "graduated series" refers hereinafter to a group of ringtones, with each ringtone different from the others in at least one of type or loudness. The different ringtones are used consistently, with one being used for a first predetermined number of calls, the second for the second predetermined number of calls, and so on. In the examples given here, for clarity, each step in the graduated series will consist of one call although other numbers of calls are possible. In the preferred graduated series, the first call is mute, with subsequent calls using the instrument's current ringtone. In another example, the first call is mute, with the next call producing a vibration of the instrument but no sound, and subsequent calls use the instrument's current ringtone. In yet another example, the first call is mute, with the next call producing a vibration of the instrument but no sound, the third call uses the current ringtone at a low volume, with each subsequent call within the predetermined time using a louder ringtone. Many other examples will be obvious.

In some embodiments, the series is a graduated series, where the first at least one call from a caller is mute so that the attention of the recipient will not be drawn to the incoming call. The recipient is notified of a second at least one call from the same caller by a vibratory response, which may be silent or may be accompanied by a discreet buzzing.

In some embodiments, there is a graduated series of further calls. In some of those embodiments, the third at least one call will elicit a ringtone, and subsequent at least one calls elicit the same ringtone, but with an increasing volume. In other embodiments of the graduated series, the third and subsequent at least one calls elicit different ringtones, so that a recipient can determine how many times the caller has been trying to make contact.

In preferred embodiments, it is the absolute number of calls within a predetermined time that determines progression in the ringtone series; the time elapsed between calls is not taken into account. In other embodiments, the frequency of calls determines progression in the ringtone series; for example, a third call within twice the predetermined time will elicit a vibratory signal, while a third call after twice the predetermined time will be mute. In a preferred embodiment, the predetermined time is about 5 minutes.

In a preferred embodiment of the system, each identifier is assigned to a category, where the categories are selected from the group consisting of: "always mute" and "graduated series". In another embodiment, the group also includes "always signaled".

In another embodiment of the system, each caller is assigned to a category, where the categories are selected from the group consisting of: "always mute" and "graduated series". In a variant of this embodiment, the group also includes "always signaled".

In an embodiment of the system, calls can be differentiated by type of caller, for example, types of caller such as, but not limited to, what's up, Skype, sms, notification of new information, advertisement, call from members of a contact list, and call from identifiers not on any contact list. In this embodiment, for a given grouping of caller, the recipient chooses whether a call from the caller is signaled for all calls, is signaled for no calls, or whether the graduated series of signal is used. As an illustrative example, a recipient specifies that, for what's up and sms calls, the call is never signaled. For calls from persons not on a contact list, the graduated series of signals is used. For all other calls, the default (call is always signaled) is used.

For the graduated series of calls, the ringtone will change after N calls, where N is an integer greater than or equal to 1. In preferred embodiments, the default value of N is 1.

In a preferred embodiment, presence of the system in a communication device such as a cellphone is shown by an icon. An embodiment of such an icon is illustrated in FIG. 1a.

In a preferred embodiment, pressing and releasing the icon toggles between activating the system and deactivating the system. In preferred embodiments, pressing and holding the icon enables the user to set parameters of the system such as, but not limited to, the maximum time between calls in a series, the frequency of calls, the maximum time for which a call may be counted a part of a series, whether a grouping of call uses the graduated series, whether a grouping of call is always signaled, whether a grouping of call is ignored by the system, whether a grouping of call is always mute, the type of signal used for each call in the series, the individual signal used for a given call in the series, individual identifiers that are always to be signaled, individual identifiers for which the graduated series is to be used, individual identifiers which are always mute, individual callers that are always to be signaled, individual callers for which the graduated series is to be used, individual callers which are always mute, treatment of identifiers belonging to no grouping, and new groupings of call.

In an embodiment, access to at least some part of the system of the present invention is enabled from other sections of the telephone command system. An example, but not the only example, of such an other section is "shortcuts".

In some embodiments, a call may belong to more than one grouping. For example, a caller who is on a list of "friends" may contact a recipient via Skype. In this example, calls from members of the "friends" list are always signaled; Skype calls are signaled using the graduated series of signals. In preferred embodiments, if a call is a member of at least one list that is always signaled, the call will always be signaled. In other embodiments, if a call is a member of at least one list that is to be signaled via the graduated series, the call will be signaled via the graduated series.

In an embodiment of the system, the method used to determine the existence of previous calls may differ for different categories of call. For non-limiting examples, for a telephone which log calls, the system can check the internal telephone log for timing information; for what's up, the system can check what previous inquiries were sent to the recipient's identifier; and for Skype, the call log will be checked.

In embodiments enabled to ignore a grouping of calls, if a call is a member of a grouping classified as "ignored", membership in said grouping does not affect how the incoming call is signaled.

In a preferred embodiment, if the caller's identifier does not appear in at least one list of known identifiers, the call will always be mute.

In some embodiments, the checks are made against the identifier of a given call. In other embodiments, the checks are made against the caller. In embodiments where the checks are made against the identifier, no check is made of the identity of the caller. If a given caller calls, within the predetermined time, once via Skype, the second time via a landline and the third time via a cell phone, each of the calls is mute. However, if the check is made against the caller, if the graduated series is used, the second call will be signaled by a vibratory tone, while the third call will be signaled by a ringtone.

In some embodiments, for at least one stored identifier, the system will store the grouping against which the identifier is to be checked. For example, a given identifier may be identified as "friend" so that the signal will always follow the "friend" signaling rule even if the call is carried on Skype and the instrument is set to "graduated series" for Skype calls and to "graduated series" if any grouping is "graduated series".

Figure 1B:
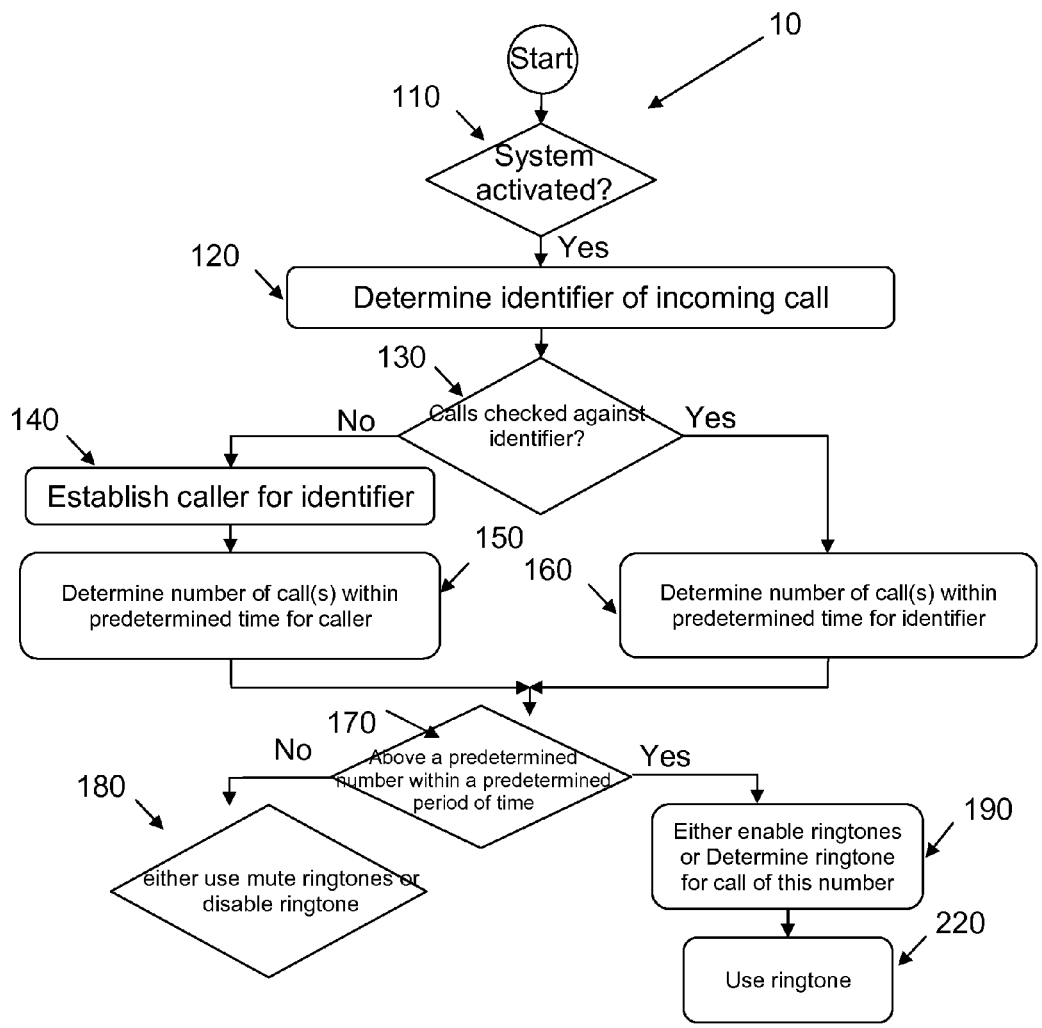

Reference is now made to FIG. 1b illustrating a preferred embodiment of the system and method of the present invention.

FIG. 1b illustrates a flow chart showing an embodiment of a method (10) for managing phone ring tone profiles. In this embodiment, when a call arrives, the phone checks if the system is activated (110). If the phone is activated, the system determines the identifier of the incoming call—the unique number or other identification of the instrument which sent the call. The system then checks whether the number of calls is to be determined (130) for the identifier or for the owner of the identifier—the caller who wishes to establish communication. If the number of calls is to be determined for the identifier, then the system determines, as described hereinabove, the number of calls within the predetermined time, with that identifier (160). If the number of calls is to be checked for the caller, then the caller, the owner of the identifier, is found (140) from at least one list comprising callers and the identifiers belonging to the callers. Once the caller is found for the identifier, the number of calls from that caller is found (150), by checking all of the identifiers associated with that caller. If the total number of calls within the predetermined time (170) is below a predetermined number, then either the phone's mute ringtone is used or ringtones are disabled; the recipient of the call can see on the instrument's screen (if there is one) that a call has arrived, but no other signal of the arrival of a call is given (180). If the total number of calls within the predetermined time (170) is above the predetermined number, then either ringtones are enabled or, if different ringtones are used for calls of different numbers, the ringtone for this call is determined and enabled (190), and the chosen ringtone for a call of this number is used (200).

As mentioned above, the present invention provides a method (10) for managing and disabling phone ring tone profiles, the method comprising steps of
  a. providing a system comprising:
    i. a storage system comprising (a) a plurality of ringtones adapted to be activated when an incoming call is made; and, (b) at least one list of identified callers;
    ii. at least one processor to execute at least one data processing system, said at least one data processing system comprising:
      1. an acquiring module operable to read an identifier of an incoming call or an incoming message;
      2. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and,
      3. a disabling module adapted to either activate or disable said ringtones according to at least one selected from a group consisting of (a) the number of calls by the same caller within said predetermined period of time; (b) the number of calls having the same identifier within said predetermined period of time; and any combination thereof;
  b. if the system is activated (see step 110), receiving an incoming call;
  c. identifying said identifier for said incoming call (see step 120);
  d. if no identification is made, establishing a caller for said identifier (see step 140);
  e. counting/determining at least one selected from a group consisting of (a) calls from the same identifier; (b) calls made by the same caller (see steps 150 and 160);
  f. disabling said ringtones if said number of calls having said same identifier within said predetermined period of time is less than a predetermined amount; or enabling said ringtones if said number of calls being made by said same caller within said predetermined period of time is no less than a predetermined amount (see steps 170, 180, 190 and 220).

As also disclosed above, it is another object of the present invention to provide a method (10) for enabling a communication device to vary an incoming call notification signal. The method comprising steps of:
  a. providing a system comprising:
    i. a storage system comprising (a) a plurality of ringtones; at least one of which is a mute ring tone profile of the system and at least one second ring tone profile of the system; said at least one second ring tone profile of the system is substantially different from said mute ring tone profile; and, (b) at least one list of identified callers;
    ii. at least one processor to execute at least one data processing system, said at least one data processing system comprising:
      1. an acquiring module operable to read an identifier of an incoming call or an incoming message;
      2. a detecting module operable to detect if the identifier exists in said at least one list in the system, to determine the caller from said list, and to detect how many incoming calls have been made within a predetermined period of time having at least one selected from a group consisting of (a) being made from the same identifier; (b) being made by the same caller; and
      3. a switching module operable to select the current ring tone from said plurality of stored ringtones according to at least one selected from a group consisting of (a) the number of calls by the same caller within said predetermined period of time; (b) the number of calls having the same identifier within said predetermined period of time; and any combination thereof
  b. if the system is activated (see step 110), receiving an incoming call;
  c. identifying said identifier for said incoming call (see step 120);
  d. if no identification is made, establishing a caller for said identifier (see step 140);
  e. counting at least one selected from a group consisting of (a) calls from the same identifier; (b) calls made by the same caller (see steps 150 and 160);
  f. setting the current ringtone based on said number of calls, said current ringtone being said mute ringtone profile if said number of calls having either said same identifier or being made by said same caller, within said predetermined period of time, is less than a predetermined number and said current ringtone being said second ring tone profile if said number of calls having either said same identifier or being made by said same caller, within said predetermined period of time, is greater than a predetermined number (see steps 170, 180, 190 and 220).

Figure 2:
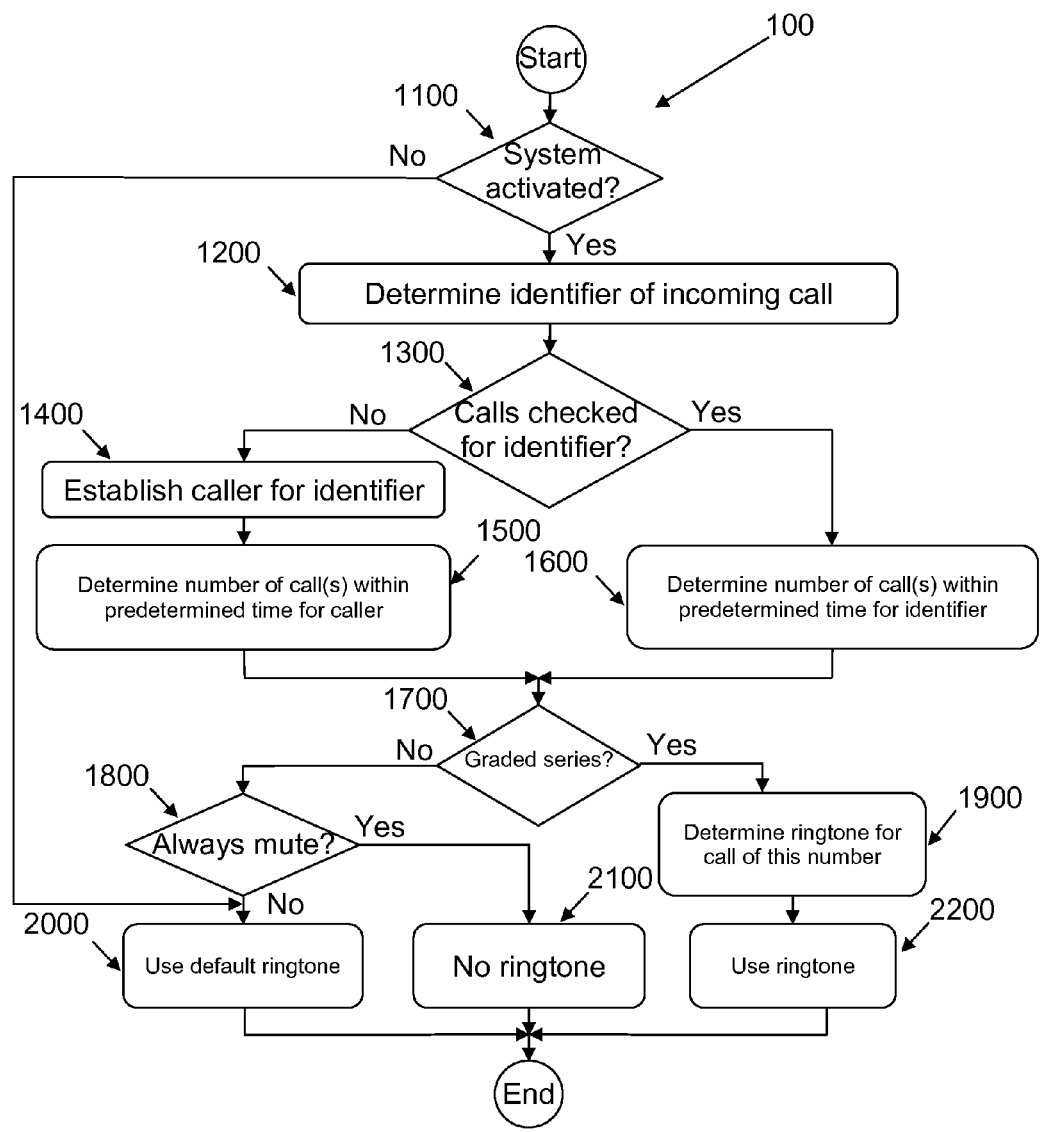

FIG. 2 illustrates a flow chart (100) of a preferred embodiment of a method of implementing the system. In this embodiment, when a call arrives, it is checked whether or not the system of this invention is activated (1100). If the system is not activated, then the default ringtone for this identifier set by the receiving instrument is used (2100).

If the system is activated (1100), the identifier for the incoming call is determined (1200). If the number of calls within the predetermined time is to be checked for the identifier (1300), the number of calls within the predetermined time from that identifier is found (1600). In the case that the number of calls is checked for the caller, not the identifier, the caller for that identifier is established (1400) and the number of calls from that caller within the predetermined time is found (1500).

Once the number of calls is known, it is checked whether the graduated series is to be used (1700). If it is, the ringtone is determined for that number of calls (1900), and the appropriate ringtone is used to signal the call (2200). If the graduated series is not to be used (1700), and the call is "always mute" (1800), the call is mute (2100); no ringtone is used. If the call is not "always mute" (1800), the default ringtone set by the receiving instrument is used (2000).

Figure 3A:
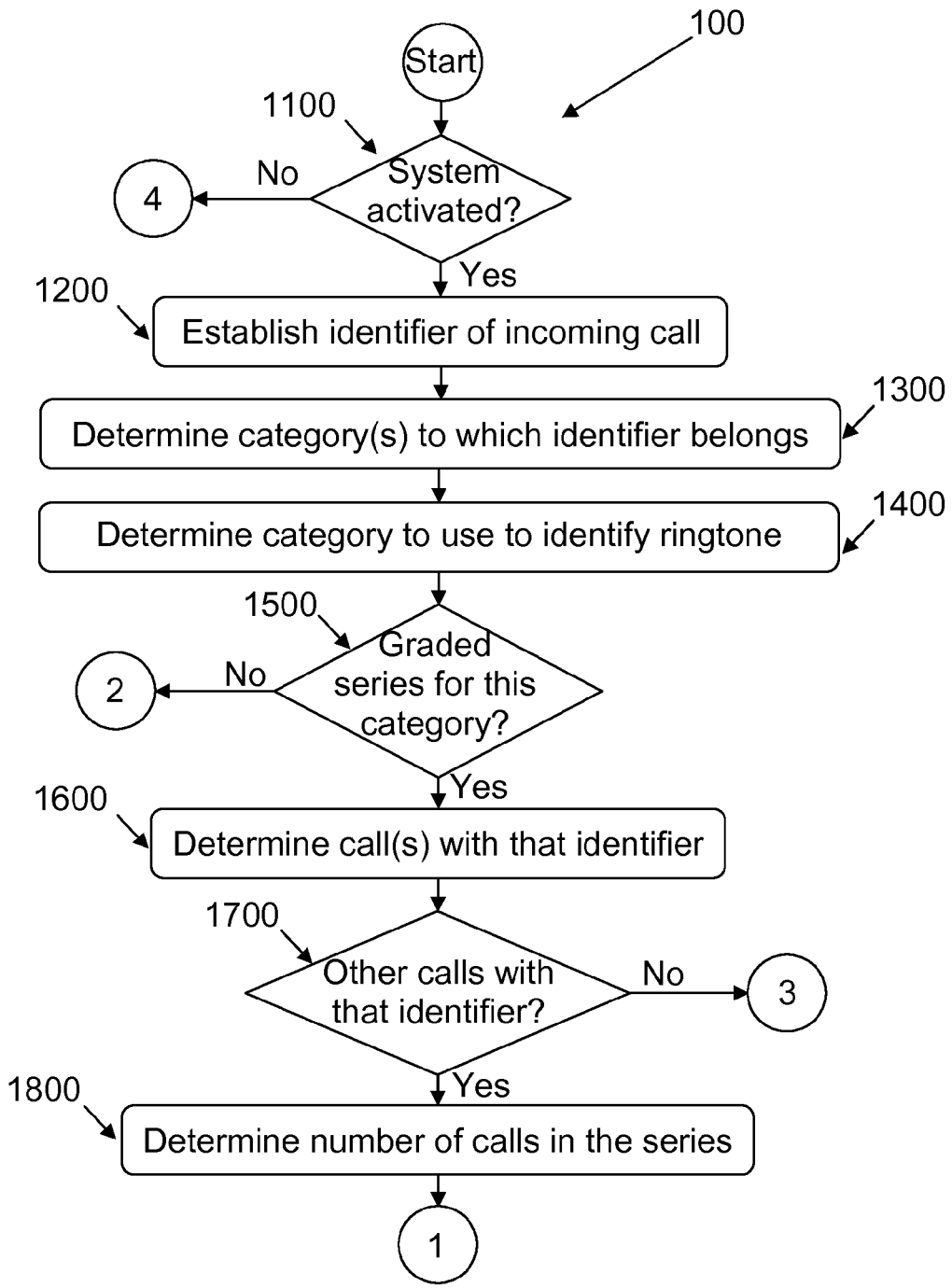
Figure 3B:
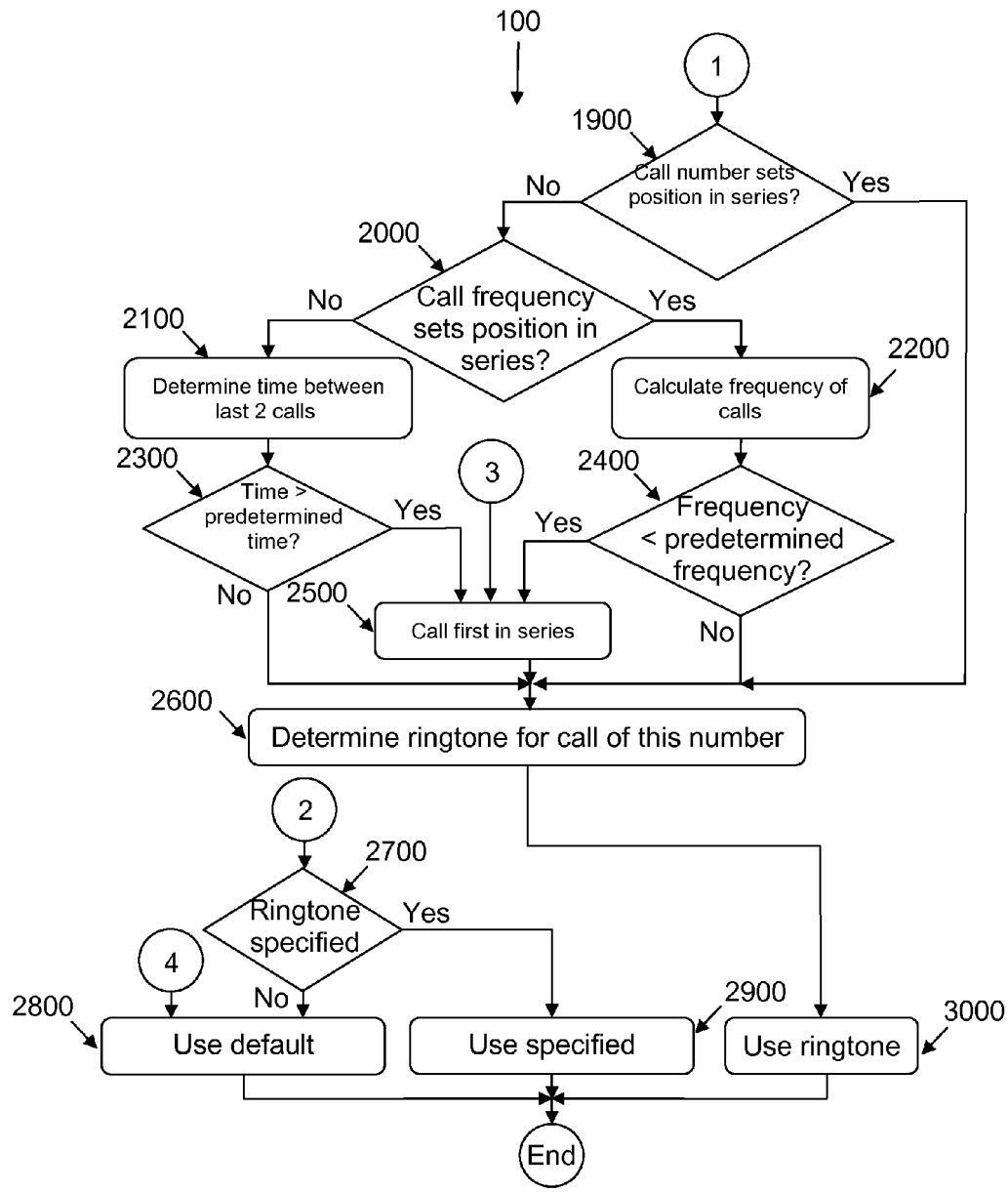

FIG. 3 illustrates a flow chart (100) of another embodiment of a method of implementing the system. In this embodiment, when a call arrives, it is checked whether or not the system of this invention is activated (1100). If the system is not activated, then the default ringtone for this identifier set by the receiving instrument is used (2800).

If the system is activated (1100), the identifier for the incoming call is determined (1200), the categories to which that identifier belongs are found (1300), and the grouping is identified which will determine the type of ringtone (1400). If a graduated series is not used for calls in this grouping (1500), then the identifier is checked as to whether a specified ringtone is to be used for this identifier (2700). Non-limiting examples of specified ringtones are "always mute", a ringtone unique to a given identifier such as a ringtone identifying a call from one's spouse, a "friend" ringtone, and a "business call" ringtone. If a ringtone has been specified for this identifier, it is used (2900). If no ringtone has been specified, the default ringtone set by the receiving instrument is used (2800).

If a graduated series is used (1500), then the appropriate list (phone log, group log, or other as appropriate) is checked and all calls with that identifier are found (1600). If there are no other calls with that identifier (1700) then this is the first call from that identifier (2500), the appropriate ringtone for a first call is determined (2600) and used (3000). In a preferred embodiment, as a first call, it will be mute.

If there are other calls with this identifier (1700), the number of calls with that identifier is determined (1800). In a preferred embodiment, this is the number of calls within a predetermined time, for a non-limiting example, the number of calls within the last hour.

If the number of calls received from a given identifier determines the type of ringtone (1900) then the ringtone for that number of calls is chosen (2600) and used (3000). If the call frequency determines the type of ringtone (2000), then the call frequency is calculated (2200) from the number of calls and the time elapsed since the first call in the series, and this frequency is compared to a predetermined frequency (2400). If the frequency is less than a predetermined frequency, then the call is effectively the first of a series (2500), the appropriate ringtone for a first call is specified (2600) and used (3000). In a preferred embodiment, as a first call, it will be mute.

If the frequency is greater than the predetermined frequency (2400), then the ringtone for a call at that position in the graduated series is specified (2600) and used (3000).

If the call frequency does not set the position in the graduated series (2200), then the time between calls sets the position in the graduated series, and the time elapsed since the previous call is determined (2100). If the time elapsed is greater than a predetermined time (2300), then the call is effectively the first of a series (2500), the appropriate ringtone for a first call is specified (2600) and used (3000). In a preferred embodiment, as a first call, it will be mute.

If the time elapsed is less than a predetermined time, then the ringtone for a call at that position in the graduated series is specified (260) and used (3000).

In some embodiments of the system, the parts of the system modifiable by a user are divided into at least two sections. In some embodiments, the two parts may be labeled "standard" and "advanced". In the "standard" section, the user may alter the method of determining position in a series (call frequency, time between calls, or number of calls), (default is time since previous call); and the times (maximum time an identifier may be used, time between calls to be used, frequency of calls), (default is 5 minutes between calls and 2 hours for maximum time an identifier remains part of a series); and assigning individual identifiers to categories. In the "advanced" section, the user may specify the hierarchy of categories (default is "always signaled" outweighs "graduated series", which outweighs "always mute"); whether each caller is assigned a grouping (default) or whether all categories are checked for each identifier; "always mute" for callers not in any contact list (default is "off"), callers in a "white list" of "always signaled" (default is "none"), which categories are ON (default is all ON).

In a preferred embodiment, the system has default values for all user-adjustable parameters, said default values adapted to provide the user with a readily-usable and convenient system, and said default values included in the system at installation.

In a preferred embodiment, the system includes a "reset all" function such that, when activated, all user-adjustable parameters return to their default values.

In a preferred embodiment, pressing and releasing the icon (FIG. 1a) toggles between activating the system and deactivating the system. In some embodiments, pressing and holding the icon enables the user to set parameters of the system such as, but not limited to, the maximum time between calls in a series, the frequency of calls, the maximum time for which a call is counted a part of a series, whether a grouping of call uses the graduated series, whether a grouping of call is always signaled, whether a grouping of call is ignored by the system, whether a grouping of call is always mute, the type of signal used for each call in the series, the individual signal used for a given call in the series, individual identifiers that are always to be signaled, individual identifiers for which the graduated series is to be used, individual identifiers which are always mute, individual callers that are always to be signaled, individual callers for which the graduated series is to be used, individual callers which are always mute, treatment of identifiers belonging to no grouping, and new groupings of call.

In preferred embodiments, pressing and holding the icon activates a screen which enables the user to set simple parameters such as, but not limited to, (1) the maximum time for which a call is counted as part of a series (default: 5 minutes), and (2) the number of calls for each step in the progression (default: 1).

In some embodiments, this screen also enables the user to activate another screen which enables the user to set advanced parameters.

In other embodiments, access to the "advanced settings" screen is via another section of the telephone, such as an "advanced settings" screen which is part of a factory-installed data processing system of the instrument or via a "shortcut" button.

The "advanced settings" screen enables the user to alter parameters such as, but not limited to,
(1) whether progression in the series depends on (a) the maximum time for which a call is counted as part of a series (default) or (b) the frequency of the calls and, if (a), the maximum time for which a call is counted as part of a series (default: 5 minutes);
(2) whether calls are checked by caller (default), no matter what identifier or channel is used, or by identifier, independent of the caller;
(3) whether calls from callers or identifiers not on any list of callers or identifiers are always mute (default);
(4) whether a two-step, three-step or multi-step graduated series is active (default: 2-step); and
(5) setting a time at which the applications starts automatically and/or a time at which it the application shuts down automatically (default: no times set).

In preferred embodiments, the first call from a particular caller is mute. A second call within the predetermined time is signaled, independent of the identifier of the call or the channel used to make the call (whats up, skype, sms, landline, e-mail, cellphone).

In preferred embodiments, the predetermined time is 5 minutes.

In a preferred embodiment, each channel is checked as to whether there has been a call from the caller on that channel within the predetermined time. The method of checking may differ between channels. For non-limiting examples, the telephone's internal log can be checked for landline and cellphone calls, what's up can be checked for previous enquiries, and the Skype call log can be checked for Skype calls.

In a preferred embodiment, calls are checked against the caller, so that if a caller has several identifiers, a second call by that caller via any channel is counted as a second call. For example, the first call may be via a landline and the second via Skype. In a preferred embodiment, this second call will elicit the current ringtone for the instrument, not the mute ringtone of a first call.

In another embodiment, the system of the present invention keeps a private log of calls which have arrived within the predetermined time, listing said calls by caller. In this embodiment, when a call arrives, the system identifies the caller, adds the call to the private log, starts a timer, and uses said private log to find the number of calls from said caller and, from said number of calls, determines the appropriate ringtone. Using the time, the system determines how long a call has been in the private log and, after a call has been in the private log for more than the predetermined time, it is removed from the private log.

In another embodiment, the system of the present invention keeps a private log of calls which have arrived within the predetermined time, listing said calls by identifier. In this embodiment, when a call arrives, adds the call to the private log, starts a timer, and uses said private log to find the number of calls from said caller and, from said number of calls, determines the appropriate ringtone. Using the time, the system determines how long a call has been in the private log and, after a call has been in the private log for more than the predetermined time, it is removed from the private log.

The invention claimed is:

1. A system for managing and disabling phone ring tone profiles, the system comprising:
   a. a storage system comprising (a) a plurality of ringtones adapted to be activated when an incoming call is made; and, (b) at least one list of identified callers;
   b. at least one processor to execute at least one data processing system, said at least one data processing system comprising:
      i. an acquiring module operable to read an identifier of said incoming call or an incoming message;
      ii. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and
      iii. a disabling module adapted to either activate or disable said ringtones according to at least one selected from a group consisting of (a) the number of calls by the same caller within said predetermined period of time; (b) the number of calls having the same identifier within said predetermined period of time; and any combination thereof;
   wherein said disabling module of said system disables said ringtones if said number of calls having said same identifier or being made by said same caller within said predetermined period of time is no more than a predetermined amount; further wherein said disabling module of said system activates said ringtones if said number of calls having said same identifier or being made by said same caller within said predetermined period of time is no less than a predetermined amount.

2. The system according to claim 1, wherein at least one of the following is being held true (a) said identifier is the caller number; said identifier is selected from a group consisting of: a cell phone number, a landline number, an e-mail address, a Skype number, an sms number, a what's up number, Viber, FaceTime, incoming communication, apple vidio call, google talk, Facebook messenger, msn messenger, yahoo messenger, AOL messenger, icq, MobileVOIP, scydo, VoipBuster, Tango Video Calls, GersenKaKaoTalk, TalkingTomCat, Messenger WithYou, any communication software that uses internet, and any combination thereof; (b) said system further comprising a setting module operable to provide a user interface for the system; (c) said ringtone is selected from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof; (d) said disabling module is adapted to select said ringtone based on at least one selected from a group consisting of: the frequency of said incoming calls, the number of said incoming calls, the number of said incoming calls within a given time, the time since the last incoming call, and any combination thereof; and any combination thereof.

3. The system according to claim 1, wherein at least one of the following is being held true (a) the first at least one call, from a given caller or identifier is mute, the second at least one call is signaled by a vibratory signal, and the third and subsequent at least one calls are signaled by a ringtone, with the volume of the ringtone increasing with each call; (b) the first at least one call, in a predetermined period of time, from a given caller or identifier is mute, the second at least one call is signaled by a vibratory signal, and the third and subsequent at least one calls are signaled by ringtones, with the ringtones differing for each call in the series; (c) the first at least one call, in a predetermined period of time, from a given caller or identifier is mute, the second at least one call is signaled by a vibratory signal, and the third and subsequent at least one calls are signaled by the same ringtone; (d) the first at least one call, in a predetermined period of time, from a given caller or identifier is mute, the second and subsequent at least one calls are signaled by a ringtone, with the volume of the ringtone increasing with each call; (e) the first at least one call, in a predetermined period of time, from a given caller or identifier is mute, the second and subsequent at least one calls are signaled by ringtones, with the ringtones differing for each call in the series; (f) the first at least one call, in a predetermined period of time, from a given caller or identifier is mute, the second and subsequent at least one calls are signaled by the same ringtone; and any combination thereof.

4. The system according to claim 1, wherein at least one of the following is being held true (a) presence of the system in a device is shown by an icon; (b) said system is activated and deactivated via said icon; (c) parameters of the system are set via said icon; (c) said system additionally comprising a private log wherein at least one of callers and call identifiers are stored for a predetermined time; wherein said ringtone is determined from the number of calls from said caller or said identifier in said private log.

5. A system for managing phone ring tone profiles, the system comprising:
 a. a storage system comprising (a) a plurality of ringtones; at least one of which is a mute ring tone profile of the system and at least one second ring tone profile of the system; said at least one second ring tone profile of the system is substantially different from said mute ring tone profile; and, (b) at least one list of identified callers;
 b. at least one processor to execute at least one data processing system, said at least one data processing system comprising:
  i. an acquiring module operable to read an identifier of an incoming call or an incoming message;
  ii. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and
  iii. a switching module operable to select the current ring tone from said plurality of stored ringtones according to at least one selected from a group consisting of (a) the number of calls by the same caller within said predetermined period of time; (b) the number of calls having the same identifier within said predetermined period of time; and any combination thereof;
 wherein said ring tone profile of said system is set to be said mute ring tone profile if said number of calls having said same identifier within said predetermined period of time is less than a predetermined amount; further wherein said ring tone profile of said system is set to be said mute ring tone profile if said number of calls being made by said same caller within said predetermined period of time is less than a predetermined amount; further wherein said ring tone profile of said system is set to be said at least one second ring tone profile if said number of calls having said same identifier within said predetermined period of time is more than a predetermined amount; further wherein said ring tone profile of said system is set to be said at least one second ring tone profile if said number of calls being made by said same caller within said predetermined period of time is more than a predetermined amount.

6. The system according to claim 5, wherein at least one of the following is being true (a) said identifier is the caller number; said identifier is selected from a group consisting of: a cell phone number, a landline number, an e-mail address, a Skype number, an sms number, a what's up number, Viber, FaceTime, incoming communication, apple vidio call, google talk, Facebook messenger, msn messenger, yahoo messenger, AOL messenger, icq, MobileVOIP, scydo, VoipBuster, Tango Video Calls, GersenKaKaoTalk, TalkingTomCat, Messenger WithYou, any communication software that uses internet, and any combination thereof; (b) said ringtone is selected from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof; (c) said switching module is adapted to select said ringtone based on at least one selected from a group consisting of: the frequency of said incoming calls, the number of said incoming calls, the number of said incoming calls within a given time, the time since the last incoming call, and any combination thereof; and any combination thereof.

7. The system according to claim 5, wherein at least one of the following is being held true (a) the first at least one call, in a predetermined period of time, from a given caller or identifier is mute, the second at least one call is signaled by a vibratory signal, and the third and subsequent at least one calls are signaled by a ringtone, with the volume of the ringtone increasing with each call; (b) the first at least one call, in a predetermined period of time, from a given caller or identifier is mute, the second at least one call is signaled by a vibratory signal, and the third and subsequent at least one calls are signaled by ringtones, with the ringtones differing for each call in the series; (c) the first at least one call, in a predetermined period of time, from a given caller or identifier is mute, the second at least one call is signaled by a vibratory signal, and the third and subsequent at least one calls are signaled by the same ringtone; (d) the first at least one call, in a predetermined period of time, from a given caller or identifier is mute, the second and subsequent at least one calls are signaled by a ringtone, with the volume of the ringtone increasing with each call; (e) the first at least one call, in a predetermined period of time, from a given caller or identifier is mute, the second and subsequent at least one calls are signaled by ringtones, with the ringtones differing for each call in the series; (f) the first at least one call, in a predetermined period of time, from a given caller or identifier is mute, the second and subsequent at least one calls are signaled by the same ringtone; and any combination thereof.

8. The system according to claim 5, wherein at least one of the following is being held true (a) presence of the system in a device is shown by an icon; (b) said system is activated and deactivated via said icon; (c) there are at least two screens of alterable parameters, a simple screen and an advanced screen; wherein the parameters alterable via the simple screen are selected from a group consisting of: the predetermined time, the number of calls for each step in the graded series, and any combination thereof; (d) there are at least two screens of alterable parameters, a simple screen and an advanced screen; wherein the parameters alterable via the advanced screen are selected from a group consisting of: progression in the series depends on the maximum time for which a call is counted as part of a series; progression in the series depends on the frequency of the calls; whether calls are checked by caller whether calls are checked by identifier; whether calls from callers not on any list of callers are always mute (default); whether calls from identifiers not on any list of identifiers are always mute; the number of steps in the graduated series; a time at which the applications starts automatically; and a time at which it the application shuts down automatically; and any combination thereof.

9. The system according to claim 5, additionally comprising a private log wherein at least one of callers and call identifiers are stored for a predetermined time; further wherein said ringtone is determined from the number of calls from said caller or said identifier in said private log.

10. A method for enabling a communication device to vary an incoming call notification signal comprising steps of:
  a. providing a system comprising:
    i. a storage system comprising (a) a plurality of ringtones; at least one of which is a mute ring tone profile of the system and at least one second ring tone profile of the system; said at least one second ring tone profile of the system is substantially different from said mute ring tone profile; and, (b) at least one list of identified callers;
    ii. at least one processor to execute at least one data processing system, said at least one data processing system comprising:
      1. an acquiring module operable to read an identifier of an incoming call or an incoming message;
      2. a detecting module operable to detect if the identifier exists in said at least one list in the system, to determine the caller from said list, and to detect how many incoming calls have been made within a predetermined period of time having at least one selected from a group consisting of (a) being made from the same identifier; (b) being made by the same caller; and
      3. a switching module operable to select the current ring tone from said plurality of stored ringtones according to at least one selected from a group consisting of (a) the number of calls by the same caller within said predetermined period of time; (b) the number of calls having the same identifier within said predetermined period of time; and any combination thereof
  b. receiving an incoming call;
  c. identifying said identifier for said incoming call;
  d. counting at least one selected from a group consisting of (a) calls from the same identifier; (b) calls made by the same caller;
  e. setting the current ringtone based on said number of calls, said current ringtone being said mute ringtone profile if said number of calls having either said same identifier or being made by said same caller, within said predetermined period of time, is less than a predetermined number; setting said current ringtone to be said second ring tone profile if said number of calls having either said same identifier or being made by said same caller, within said predetermined period of time, is greater than a predetermined number.

11. The method according to claim 10, additionally comprising at least one step selected from a group consisting of (a) selecting said identifier to be the caller number; said identifier is selected from a group consisting of: a cell phone number, a landline number, an e-mail address, a Skype number, an sms number, a what's up number, Viber, FaceTime, incoming communication, apple vidio call, google talk, Facebook messenger, msn messenger, yahoo messenger, AOL messenger, icq, MobileVOIP, scydo, VoipBuster, Tango Video Calls, GersenKaKaoTalk, TalkingTomCat, Messenger With You, any communication software that uses internet, and any combination thereof; (b) providing a setting module operable to provide a user interface for the system; (c) selecting said ringtone from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof; and any combination thereof.

12. The method according to claim 10, additionally comprising at least one step selected from a group consisting of (a) basing selection of said ringtone by said switching module on at least one selected from a group consisting of: the frequency of said incoming calls, the number of said incoming calls, the number of said incoming calls within a given time, the time since the last incoming call, and any combination thereof; (b) specifying said predetermined period of time to be more than about 1 minute and less than about 12 hours; (c) specifying said predetermined period of time to be about 5 minutes; (d) setting the first at least one call, in a predetermined period of time, from a given caller or identifier to be mute, the second at least one call to be signaled by a vibratory signal, and the third and subsequent at least one calls to be signaled by a ringtone, with the volume of the ringtone increasing with each call; and any combination thereof.

13. The method according to claim 10, additionally comprising at least one step selected from a group consisting of (a) setting the first at least one call, in a predetermined period of time, from a given caller or identifier to be mute, the second at least one call to be signaled by a vibratory signal, and the third and subsequent at least one calls to be signaled by ringtones, with the ringtones differing for each call in the series; (b) setting the first at least one call, in a predetermined period of time, from a given caller or identifier to be mute, the second at least one call to be signaled by a vibratory signal, and the third and subsequent at least one calls to be signaled by the same ringtone; (c) setting the first at least one call, in a predetermined period of time, from a given caller or identifier to be mute, the second and subsequent at least one calls to be signaled by a ringtone, with the volume of the ringtone increasing with each call; (d) setting the first at least one call, in a predetermined period of time, from a given caller or identifier to be mute, the second and subsequent at least one calls to be signaled by ringtones, with the ringtones differing for each call in the series; (e) setting the first at least one call, in a predetermined period of time, from a given caller or identifier to be mute, the second and subsequent at least one calls to be signaled by the same ringtone; and any combination thereof.

14. The method according to claim 13, wherein the parameters alterable via the simple screen are selected from a group consisting of: the predetermined time, the number of calls for each step in the graded series, and any combination thereof.

15. The method according to claim 13, wherein the parameters alterable via the advanced screen are selected from a group consisting of: progression in the series depends on the maximum time for which a call is counted as part of a series; progression in the series depends on the frequency of the calls; whether calls are checked by caller whether calls are checked by identifier; whether calls from callers not on any list of callers are always mute (default); whether calls from identifiers not on any list of identifiers are always mute; the number of steps in the graduated series; a time at which the applications starts automatically; and a time at which it the application shuts down automatically.

16. The method according to claim 10, additionally comprising at least one step selected from a group consisting of (a) displaying an icon to symbolize presence of the system in a device; (b) activating and deactivating the system via the icon; (c) setting parameters of the system via the icon; and any combination thereof.

17. The method according to claim 10, comprising an additional step of providing at least two screens of alterable parameters, a simple screen and an advanced screen.

18. The method according to claim 10, additionally comprising a step of providing a private log wherein at least one of callers and call identifiers are stored for a predetermined time.

19. The method according to claim 18, additionally comprising a step of determining said ringtone from the number of calls from said caller in said private log.

20. The method according to claim 18, additionally comprising a step of determining said ringtone from the number of calls from said identifier in said private log.

* * * * *